Figure 1:
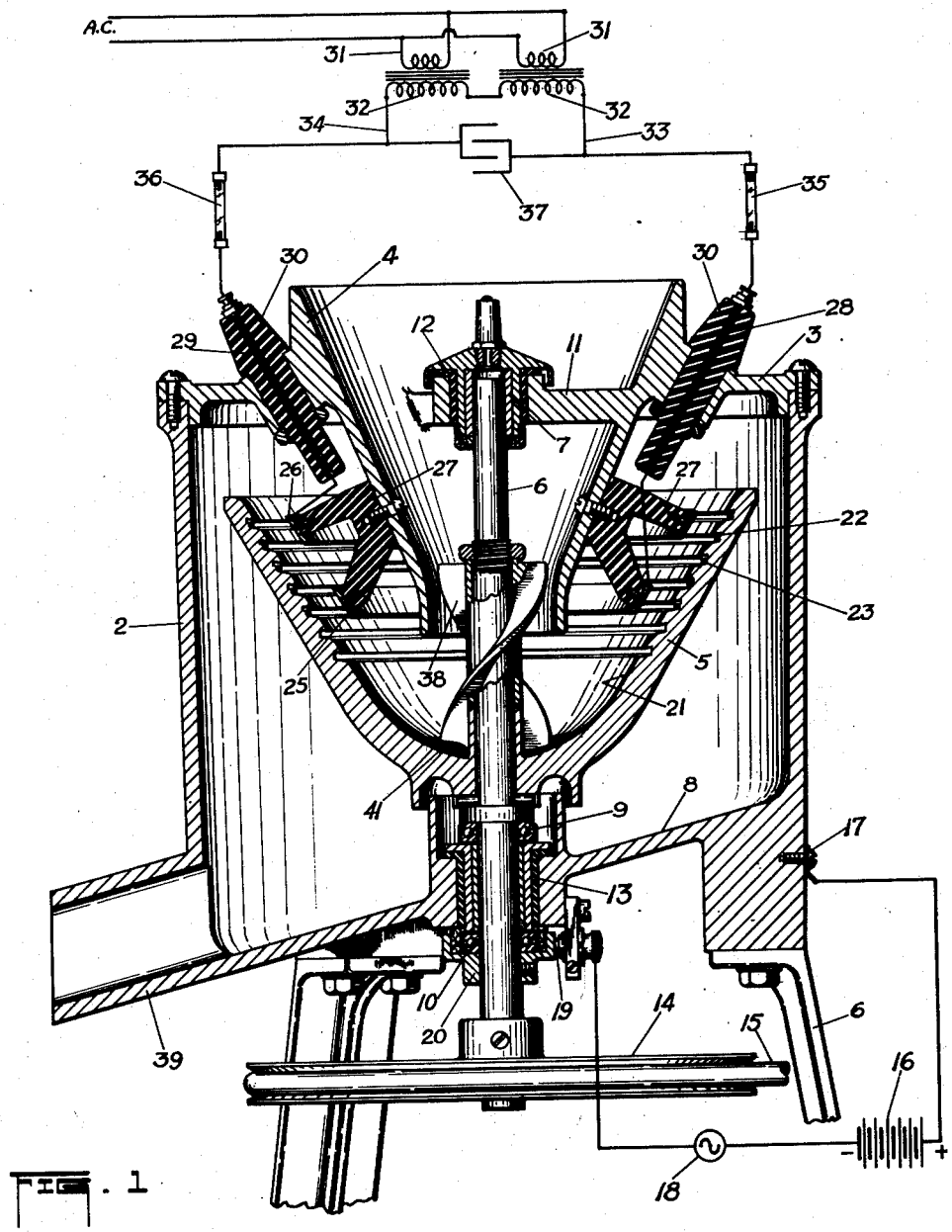

June 29, 1937.  W. A. BIESMANN  2,085,711

PROCESS OF AND APPARATUS FOR THE RECOVERY OF NOBLE METALS FROM ORE PULP

Filed Jan. 20, 1934  4 Sheets-Sheet 1

INVENTOR.
William Alfred Biesmann
BY
Arthur H. Watson
ATTORNEY.

INVENTOR.
William Alfred Biesmann
BY
Arthur H. Watson
ATTORNEY.

June 29, 1937.  W. A. BIESMANN  2,085,711
PROCESS OF AND APPARATUS FOR THE RECOVERY OF NOBLE METALS FROM ORE PULP
Filed Jan. 20, 1934  4 Sheets-Sheet 4
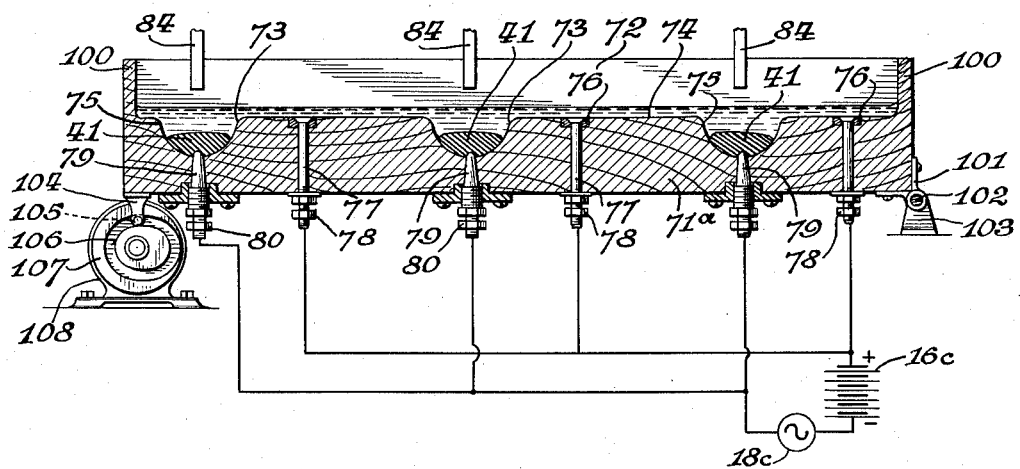
Inventor:
William Alfred Biesmann
By
Williams, Bradbury, McCaleb & Hinkle.
Attys Patented June 29, 1937

2,085,711

UNITED STATES PATENT OFFICE 2,085,711

PROCESS OF AND APPARATUS FOR THE RECOVERY OF NOBLE METALS FROM ORE PULP

William Alfred Biesmann, Chicago, Ill., assignor, by mesne assignments, to Carl W. Johnson Application January 20, 1934, Serial No. 707,523
In Canada October 25, 1933

20 Claims. (Cl. 209—179)

This invention relates to improvements in process of and apparatus for the recovery of noble metals from ore pulp and more particularly to process of and apparatus for the recovery of gold and similar noble metals in dispersed phase from the fluid dispersing medium of an ore pulp.

This application is a continuation in part of my co-pending application for patent Serial No. 669,885, filed May 8, 1933, entitled "Method of and apparatus for electronic centrifugal separation".

Heretofore many attempts have been made to provide an efficient, practical and economical process for the recovery of gold and other noble metals from ore pulp which would include the recovery of fine particles of the metal of such size as to exist in dispersed phase by virtue of the dispersing action of the fluid media of the pulp. Of the various processes proposed, only those wherein the highly dispersed metal was recovered by first causing the metal to enter into chemical solution, have met with appreciable success, the most common of such processes being the so-called "cyanide process". Processes involving the formation of chemical solutions are, however, too costly to permit of their practical use on a small scale, or under conditions where the yield in the metal recovered, per ton of pulp, is relatively low.

An object of my invention is to provide a simple and efficient process for the recovery of gold and other noble metals from ore pulp which may be carried out economically on ore pulp of relatively low yield regardless of whether the process is practiced on a small or extensive scale.

Another object is to provide a process as described wherein widely dispersed gold, and other metals of the noble group, in ore pulp may be recovered by inducing the amalgamation of the dispersed metal with mercury.

Another object is to provide a process of the character described wherein the particles or pieces of metal sought to be recovered which are of such size as to react to centrifugal and gravitational forces are simultaneously recovered with the recovery of the dispersed particles which do not readily react to such forces or which are inherently incapable of so reacting.

Another object is to provide novel and practical apparatus for use in carrying out the process described.

Other objects, the advantages and uses of the invention will be, or should become apparent after reading the following specification and appended claims.

For the purpose of this specification the expression "ore pulp" is used as including a mixture of any earthy matter whether crystalline or amorphous in character containing gold or other noble metals such as sand, gravel, milled ores, clays or mineral conglomerates, and water or other liquid in such proportions as to provide a substantially fluid mixture. The expression "in dispersed phase" and the term "dispersed" where used in describing gold or other metals in the ore pulp is used as including suspensions and/or suspensoids of the metal; the term "suspensions" differing from the term "suspensoids" chiefly in that the former includes particles of the metal of such size that they may, in time, settle in the fluid of the pulp; whereas the latter has reference to particles of such size that, in the absence of a flocculating agent, a condition of stable dispersion is maintained. The term "fluctuating" where used in reference to electric currents or electrical fields is used as including both interrupted or pulsating unidirectional currents, or alternating currents; or the electrical fields produced thereby.

In a simple embodiment my invention contemplates the passing of the ore pulp over one, or a series of, mercury cathodes so that the pulp may contact with the surfaces of the mercury thereof. The cathodes employed may consist of deposits of mercury located upon the inner walls of a rotating bowl and held in place thereupon, in circumferentially disposed grooves in the walls of the bowl, by centrifugal force; or they may consist of pools of mercury located in pockets provided upon the surface of an inclined table over which the pulp may flow. In some instances where the pulp treated contains little or no metal particles of such size as to readily react to gravitational forces a conventional type of amalgam plate may be employed as a cathode, such as a copper plate having its surface wetted with mercury to form an amalgam in such a manner as to leave an ample coating of free mercury upon the surface thereof.

As the pulp is thus caused to pass over the mercury cathode surfaces a low voltage unidirectional current is passed through the pulp to the aforesaid cathode, or cathodes, from any convenient electrode, or electrodes, having contact therewith.

Simultaneously with the passage of the low voltage unidirectional current through the pulp to the mercury cathodes, as the pulp is passed over the cathodes, the pulp in the region of the said cathodes is subjected to the influence of a fluctuating and relatively high potential electrical field. This field may be produced between spaced electrodes, supported above the pulp and in substantial registration with the cathodes, which are connected to the output terminals of a high voltage transformer or machine. If a high potential fluctuating unidirectional current source is employed to produce the electrical field I have found it practical to connect the negative output terminal thereof to the mercury cathodes and the positive output terminal thereof to an electrode, or electrodes, supported over the pulp. The same arrangement may be employed if desired where a high potential alternating current source is used although I consider it preferable to connect the opposed output terminals of the alternating current supply, or the fluctuating unidirectional current supply, to opposed and spaced electrodes located over the pulp in the manner first described.

The result of the combined action of the flow of the low voltage unidirectional current through the ore pulp and of the influence of the fluctuating high potential electrical field upon the pulp is that of inducing the dispersed gold or other noble metals in the pulp to form an amalgam with the mercury of the cathodes.

After the gold or metal particles have been so entrapped in the mercury the isolation of the metal, or metals, may be carried out by means well known in the art, such as the filtering of the mercury through a chamois, subsequent distillation of the amalgam thus separated, and acid treatment of the resulting metallic residue.

I have discovered that the process herein described may be successfully carried out with the use of a high potential electrical field, as described, which may lie within a wide range of voltages and number of interruptions, pulsations or alternations per second. However, for average practice I prefer to maintain the voltage between opposed and spaced electrodes, or an electrode, or electrodes, and the said cathode, or cathodes, which are spaced approximately three inches apart and within one inch of the adjacent surface of the bowl within a range of from 10,000 to 30,000 volts and the number of fluctuations of the field, per second, within a range of from 1500 to 2000.

The invention will be further illustrated by the following more detailed description taken together with the accompanying drawings which show apparatus embodying the invention and adapted for the practice of the process of the invention, but it is intended and will be understood that the invention is illustrated thereby but not limited thereto.

Figure 2:
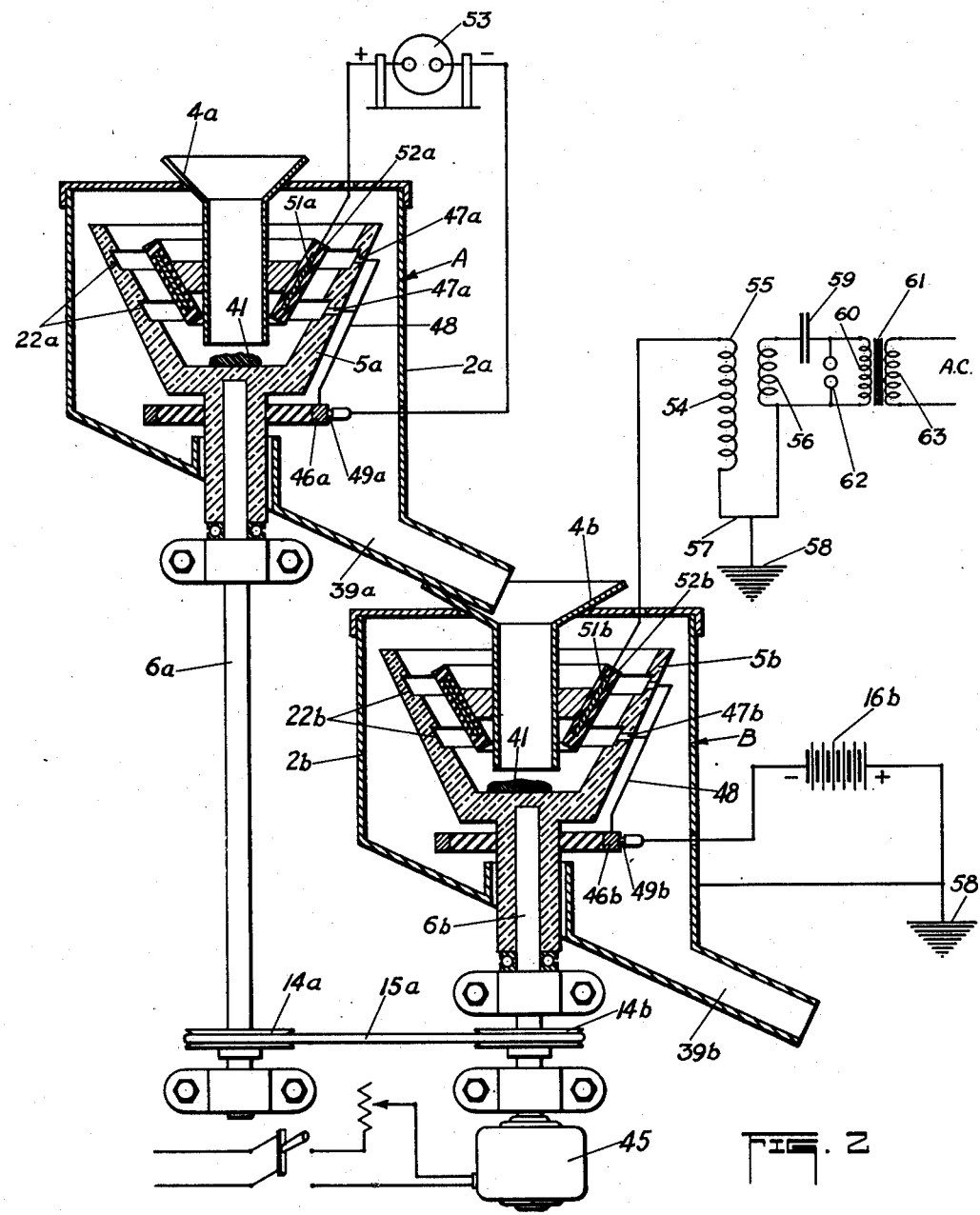
Figure 3:
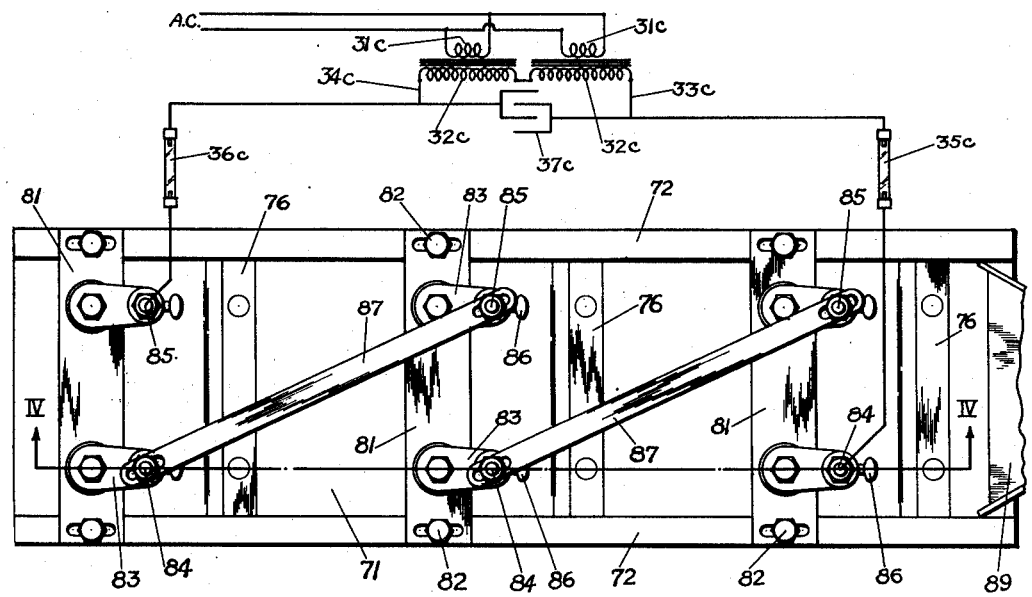
Figure 4:
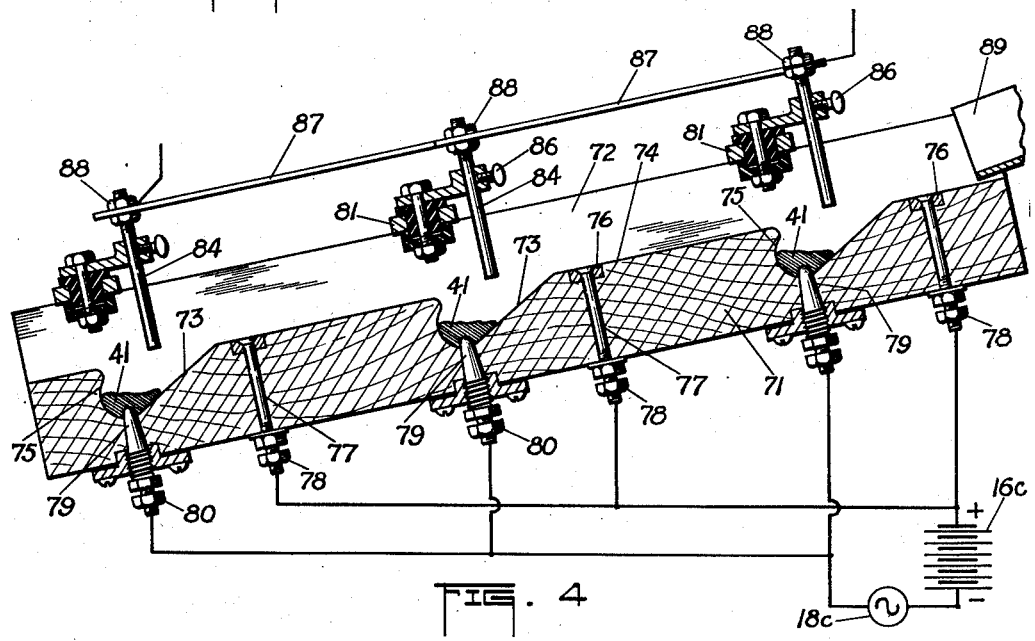

In the drawings, Fig. 1 is a vertical sectional view of an embodiment of the apparatus of my improved process, the electrical components thereof being illustrated schematically, Fig. 2 is a view similar to Fig. 1 of another form of the apparatus, Fig. 3 is a top plan view of a further form of the apparatus, and Fig. 4 is a sectional view along the line IV—IV of Fig. 3.

With reference to Fig. 1 of the drawings I have shown therein apparatus of the rotating bowl type which possesses the advantage, when used in carrying out my improved process for the recovery of the dispersed gold, or noble metals, in ore pulp under the influence of electrical forces, of also recovering, by centrifugal forces and amalgamation, the particles, or pieces, of the noble metal which are of such size as to readily react to centrifugal force but which are not appreciably affected by the electrical forces applied during the process.

The apparatus includes a housing 2, which may be formed of cast iron, or steel, having a removable top plate or cover 3 of similar material. A downspout, or funnel, 4 centrally located in the top plate 3, as by integral casting therewith, serves to conduct the ore pulp in a vertical stream into a rotating bowl 5 mounted within the housing. The bowl 5 may be constructed to wear resistant metal such as "chrome steel" to withstand the erosive action of the solid constituents of the pulp and is preferably mounted in axial alignment with the vertically extending downspout 4 in such a manner as to locate the bottom of the downspout well within the confines of the side wall of the bowl. This arrangement permits of the delivery of the pulp in a continuous stream into the bottom of the bowl and therefore the use of the downspout as the positive electrode of the low voltage unidirectional current circuit through the pulp as hereinafter described.

The mounting of the bowl 5 may be carried out, as shown, by fixing the bowl upon a vertically extending shaft 6 having its upper end rotatably mounted in a bearing 7 and its lower end extending through the bottom wall 8 of the housing 2, thrust bearings 9 and 10 being provided for the shaft, at opposite sides of the housing wall, to retain the shaft against vertical as well as lateral movement. The bearing 7 may be supported upon a spider 11, located within the downspout 4, and electrically insulated from the spider by a sleeve 12 of fibre or other suitable dielectric material. In like manner a sleeve 13, of insulating material, serves to insulate the bearings 9 and 10 from the housing. The entire bowl assembly is thus rotatably mounted within, and electrically insulated from, the surrounding housing structure. A V type drive pulley 14 may be mounted upon the lowermost end of the shaft 6 for engagement with a drive belt 15 driven by any suitable motor or engine (not shown).

I have found, in the apparatus described, a bowl speed of 250 R. P. M. to be satisfactory although it will be apparent that the speed of the bowl should be determined, to some extent, by the diameter of the bowl at its rim so that the rim speed may not approach a value inconsistent with the desired pulp flow and the strength of the walls thereof.

The low voltage undirectional current source may comprise a storage battery 16 having its positive terminal connected with the housing 2 as shown at 17 and therefore with the downspout 4. The negative terminal of the battery 16 may be connected through a ballast lamp 18 with a carbon brush 19, insulated from and supported upon the housing 2, bearing upon a copper collector ring 20 supported directly upon the metal shaft 6 of the bowl assembly. An ordinary 110 volt incandescent lamp may be employed as the ballast lamp 18.

The mercury cathodes are provided by the disposition of mercury 41 in the bowl 5 which under the influence of centrifugal force, during the rotation of the bowl in the manner described, moves upwardly along the divergent inner side wall 21 of the bowl and into a plurality of annular grooves 22 formed therein where the mercury is retained in place during the functioning of the process. The upper of the plurality of grooves 22 may have mercury amalgamated copper rings 23 disposed therein to further aid in retaining the mercury of the cathodes in place in the grooves and to reduce slippage of the fluid mercury along the grooves due to the inertia thereof.

The difference in potential between the positively charged electrode, or electrodes, and the negatively charged mercury cathode, or cathodes, is preferably such as to cause the passage of 155 milliamperes of current through the pulp for each square inch of negatively charged mercury surface exposed to the pulp. In the apparatus of Fig. 1 the entire inner surface of the bowl 5 would have a negative charge.

The fluctuating high potential electrical field may be established between a pair of spaced apart annular copper electrodes 25 and 26 supported upon a plurality of brackets 27 of fibre, porcelain or other suitable dielectric material supported upon, and extending radially from, the outer side wall of the downspout 4. The electrodes 25 and 26 are so arranged as to be concentric to the grooves 22 in the bowl 5 within which the mercury of the cathodes is disposed, and at a distance therefrom sufficient to avoid contact with the pulp as it flows upwardly over the divergent side walls of the bowl under the influence of centrifugal force; but within a distance such as to assure the disposition of the pulp, adjacent the cathodes, within the electrical field established between the electrodes. Lead-in cables 28 and 29, for the electrodes 25 and 26 respectively, may extend through insulating tubes 30 of the housing for connection with the fluctuating high potential current supply.

In the apparatus of Fig. 1 I have illustrated electrical apparatus for supplying the fluctuating high potential current that may be operated by a 110 volt 60 cycle alternating current, such as employed for lighting purposes. This apparatus may comprise a pair of transformers having their primary windings 31 connected in parallel to the alternating current supply line and their secondary windings 32 connected in series, the output potential of the series connected secondaries being approximately 30,000 volts across their output terminals 33 and 34. The terminal 33 of the transformer assembly may be connected, through a neon tube 35, with the lead-in cable 28, and the terminal 34, in like manner, may be connected, through a neon tube 36, with the lead-in cable 29. A condenser 37 may be shunted across the transformer output terminals 33 and 34 with the result that the frequency of the current across the terminals 33 and 34 is rendered relatively high. I prefer to employ a condenser having a capacity such as to maintain the frequency across the electrodes 25 and 26 between 1500 and 2000 cycles. The neon tubes 35 and 36 may be of the type commonly used for "neon signs" and about one foot in length. The purpose of the tubes 35 and 36 is primarily, to produce a substantially sharp cut off in the cyclic current flow to the electrodes 25 and 26. Obviously, other gas content, or vacuum tubes, may be substituted for the neon tubes 35, or the tubes may be eliminated altogether, although I prefer to employ them in the particular circuit shown for the purpose stated.

In order to bring the ore pulp quickly up to the speed of the rotating bowl 5 a screw 38 may be fixed to the shaft 6, at the bottom of the bowl 5, thereby to help in overcoming the inertia of the pulp stream as it flows from the downspout 4 into the bowl. A discharge spout 39 at the bottom of the housing 2 serves to carry away the treated pulp after it has completed its course of travel, during treatment, over the divergent walls of the bowl.

In the apparatus described in the preceding paragraphs, and illustrated in Fig. 1, the following dimensions and values have been found to provide practical results in the working of the process; rim diameter of the bowl 5, twenty-four inches, inclination of the side walls of the bowl thirty degrees from vertical, bowl speed 250 R. P. M., depth of the grooves 22, three eighths of an inch, distance between the bottom of the downspout 4 and the bottom of the bowl approximately four inches, distance between the electrodes 25 and 26, three inches, distance between electrodes 25 and 26 and the inner wall of the bowl one inch, output voltage of the low voltage battery 16, thirty-two volts, and rate of delivery of the ore pulp into the bowl approximately three cubic feet per minute.

During operation of the process, as by the apparatus of Fig. 1, the ore pulp, which has been previously prepared by mixing the earthy matter containing the gold, or other noble metals, with water to form a fluid mixture, may be fed in a continuous stream through the downspout 4 into the rotating bowl 5, the mercury 41 placed in the bowl, as shown, having assumed its operative positions in the grooves 22 on the walls of the bowl 5 by centrifugal forces acting thereupon as described.

As the pulp moves upwardly and over the mercury cathode surfaces thus provided the low voltage unidirectional current from the battery 16 flows from the downspout 4 to the bowl including the mercury in the grooves 22. At the same time the pulp in the region of the negatively charged mercury surfaces is subjected to the influence of the high potential alternating current field established between the electrodes 25 and 26. The result of these electrical forces acting simultaneously upon the dispersed gold in the ore pulp, as it flows over the mercury surfaces, is to induce the dispersed particles of gold to enter into an amalgam with the mercury from whence they may be removed in such a manner as heretofore described.

The particles, or pieces of gold, of such size as to react to centrifugal force will be found to have also entered into an amalgam with the mercury, although as to such particles or pieces, it is believed, for the most part, the electrical forces employed in the process have but little effect. There may be, however, a range in particle size which I choose to identify as adjacent and below the border line between the heavier suspensions and the particles incapable of such classification because of increased size where the combined electrical forces described may aid in inducing the amalgamation to take place. Obviously, there is no sharp line of demarcation between pieces incapable of suspension in water, particles of lesser size, exhibiting little tendency to remain suspended, suspension particles, and suspensoids. My improved process is particularly adapted for the recovery of the suspension particles and suspensoids.

The process thus described presents advantages that have never heretofore been attained, the most important of which is the ability to recover by continuous treatment of a comparatively rapidly moving pulp stream the widely dispersed gold suspension and suspensoids commonly referred to as colloidal gold, and in addition to recover the larger particles or pieces of gold such as may now be recovered by certain well known non-chemical processes. The low cost of operation lends an added advantage to the process for those who are limited in their operations to claims giving a relatively low yield of precious metal per ton. A further advantage is that the water used in preparing the pulp may be recycled thus to permit the economical operation of the process in relatively arid country.

In Fig. 2 of the drawings I have shown another form of the apparatus of my invention comprising two units A and B operating in series. Each of the units includes, respectively, a housing 2a and 2b, a downspout 4a and 4b carried by the top plate or cover of the housing, a bowl 5a and 5b constructed of insulating material, such as porcelain, having grooves 22a and 22b formed in the inner and divergent side walls thereof, a discharge spout 39a and 39b, means including pulley wheels 14a and 14b on the shafts 6a and 6b of the respective bowls interconnected by a drive belt 15a whereby the bowl of the unit A may be driven simultaneously with the bowl of the unit B, as by an electric motor 45 coupled directly to the shaft 6b of the unit B.

The units A and B further are provided with collector rings 46a and 46b mounted upon the bowls 5a and 5b respectively, and connected with metallic electrodes 47a and 47b extending through the side walls of the respective bowls and into the bottoms of the grooves 22a and 22b respectively, by means of conductors 48. Stationary brushes 49a and 49b may be provided for the collector rings 46a and 46b. Each of the units A and B further includes a frustro-conical electrodes 51a and 51b respectively, embedded in an insulating material, such as a moulded phenol composition, forming protective sheaths 52a and 52b therefor. The electrodes 51a and 51b are preferably spaced away from the grooved portions of the bowls in a manner similar to the electrodes 25 and 26 of the apparatus of Fig. 1 so that during normal operation of the process the pulp may not come in contact therewith.

In the unit A the electrode 51a may be connected to the positive terminal of a fluctuating high potential unidirectional current generating machine 53 such as an electrostatic machine and the brush 49a connected with the negative terminal of the machine.

In the unit B, which is comparable in function to the apparatus of Fig. 1, the electrode 51b is connected to one terminal of the secondary winding 54 of a high frequency step up transformer 55 the other terminal of the secondary 54 being joined to the primary winding 56 by a conductor 57 which in turn is grounded as shown at 58. The primary winding 56 of the transformer 55 may be connected in series with a condenser 59 and the secondary winding 60 of a low frequency transformer 61. A spark gap 62 shunted across the secondary 60 of the transformer 61 serves to complete an oscillating circuit including the windings 56 and 60 having a natural period of from 1500 to 2000 cycles per second. The output voltage of the transformer 55 may be approximately 30,000 volts. The negative terminal of a low voltage battery 16b is connected to the brush 49b and thus to the electrodes 47b in the grooves 22b within which the mercury of cathodes is disposed during operation of the unit. The positive terminal of the battery may be grounded upon the ground connection 58, the latter being common to the high potential transformer circuit and to the housing 2b as shown. The voltage of the battery 16b is preferably such as to pass a current of approximately 155 milliamperes through the pulp for each square inch of mercury cathode surface.

In carrying out my improved process with the apparatus of Fig. 2 the pulp is first passed through the unit A and thereafter through the unit B. The purpose of the treatment applied to the ore pulp through the combined action of centrifugal force and the high potential negative charge upon the mercury in the bowl, is chiefly to relieve the operating burden placed upon the unit B. In other words, the unit A operates to remove the larger pieces and particles of the gold, or other noble metal which are capable of reacting to gravitational or centrifugal forces as well as those particles which exist adjacent to the border line between suspensions, existing as such chiefly because of the mechanical action of the flowing and agitated pulp stream, and the suspensions of a so-called colloidal nature.

This arrangement of the steps of the process permits of the final treatment of the pulp as by the apparatus of the unit B for the removal of particles which are either suspensions or suspensoids of the metal. Should any of the larger particles or pieces of the metal pass through the treatment in the unit A, however, it is obvious that they may be recovered by induced amalgamation with the mercury in the unit B.

In operation the process as carried out by the unit B is similar to that described in connection with the apparatus of the invention illustrated in Fig. 1, the principal difference being that the high potential fluctuating field is established between electrodes, certain of which of like polarity comprise the mercury cathodes in the grooves 22b. The simultaneous action of the low voltage unidirectional current and the influence of the fluctuating high potential electrical field are such as to cause the dispersed gold, or other metal, particles to enter into amalgam with the mercury and, as to the larger particles, there may be added the action of centrifugal forces in guiding the particles to the mercury surfaces.

In Figs. 3 and 4 I have illustrated another form of the apparatus of the invention which may comprise an inclined wood table 71, having upwardly extending side walls 72, down which the ore pulp may flow under force of gravity as from a spout 89. A plurality of spaced apart pockets 73 extending transversely across the table in the upper surface 74 thereof serve to locate the mercury 41 of the cathodes. I prefer to form the pockets 73 with walls that gradually slope downwardly in the direction of the pulp flow and to form the opposite walls of the pockets substantially cylindrical so as to slightly overhang the mercury as indicated at 75.

A plurality of copper electrodes 76 located parallel to the mercury cathodes 41, one at the leading edge of each of the pockets 73 may be inlaid in the surface 74 of the table and electrically connected through the medium of bolts 77 and fastening nuts 78, as shown, with the positive terminal of a storage battery 16c. The negative terminal of the battery may be connected with the mercury in the pockets 73, as by means of electrodes 79 extending through the table into the pockets and having terminal nuts 80 at their lowermost ends adapted for connection with the negative feed wire of the battery. As in the apparatus of Fig. 1 a ballast lamp 18c may be placed in series with the negative feed wire.

Cross supports 81, one above each of the mercury cathodes, may be fixed upon the side walls 72 of the table by adjustable fastening means as shown at 82 for supporting pairs of spaced apart insulated brackets 83 upon which vertically extending pairs of electrodes 84 and 85 are mounted. Adjusting screws 86 may be employed on the brackets 83 for permitting the vertical adjustment of the electrodes to the required distance from the flowing pulp stream therebeneath.

In the apparatus illustrated I have shown three of the mercury cathodes and three pairs of the spaced apart electrodes 84 and 85, one pair in spaced relationship over each of the cathode surfaces. The three pairs of electrodes are preferably connected in series by bus straps 87. The outer electrodes 84 and 85 of the series may be connected with electrical apparatus, for producing a fluctuating high potential electrical field between the pairs of electrodes, similar to that illustrated and described in connection with the apparatus of Fig. 1. This apparatus as shown in Fig. 3, has been given the same reference numerals as applied to like parts in Fig. 1, except that the suffix "c" has been added thereto. Obviously, because of connection with the series array of electrode pairs as shown, the output voltage of the high potential current supply apparatus may be increased in proportion to the sum of the spaces between each pair of electrodes, preferably to an amount substantially equal to 10,000 volts per inch of aggregate electrode spacing.

Except for the absence of centrifugal forces acting upon the pulp the practice of the process with the apparatus of Figs. 3 and 4 is substantially the same as that described in connection with Fig. 1.

In all of the processes, and with all of the apparatus, described it has been contemplated that the pulp shall be continuously fed into the presence of the mercury cathode and during movement into contact with the cathode surfaces be subjected to the combined electrical forces described. It will be apparent, however, that the process may be carried out without continuous feeding and discharge of the pulp and that the subjection of the pulp and of the mercury to the aforesaid electrical forces may take place as in a vat containing the pulp with any suitable agitating means for preventing the solid constituents of the pulp to settle.

For example as clearly illustrated in Fig. 5, a vat 71a substantially similar in construction to the inclined wood table 71 shown in Figures 3 and 4, but having end walls 100 in addition to side walls 72, may be pivoted at one end by means of a bearing 101 on a pivot pin 102 mounted on a support 103. The other end of the vat 71a may be provided with a projecting part 104 carrying a cam follower 105 engaging in a cam groove 106 on a cam disc 107 driven by an electric motor 108. This arrangement will obviously permit the process to be carried out without continuous feeding and discharge of the pulp; the described means being adapted to agitate the vat sufficiently to prevent the solid constituents of the pulp from settling without, however, causing the pulp to contact the electrodes 84.

Where the pulp is found to contain certain other noble metals than gold, particularly platinum, I have found it desirable to add approximately 5 percent by weight of metallic sodium to the mercury of the cathodes in order to render amalgamation under the process more certain. While the sodium in the mercury is not at all necessary in the recovery of gold or of silver with my improved process, the presence of sodium in the mercury of the cathode does not in any way impair the operation of the process for the recovery of gold or of silver.

It should be understood that while I have described in detail herein certain examples of my improved process, and certain apparatus for use in connection therewith with reference to dimensions and to the characteristics, or values of the electrical circuits employed, that all have been presented for the purpose of illustration only and not as limitations as to the scope of the invention. By way of example; whereas the fluctuations of the high potential electrical field have been referred to as within a range of 1500 to 2000 fluctuations (i. e. interruptions, pulsations or cycles) per second, it has been found that fluctuations of the field as low as 60 per second and as high as 5000 per second may be employed with success. In like manner the voltage across the electrodes of the high potential field may be varied over a wide range with respect to that specified without impairing the operativeness of the process.

My improved process for the recovery of dispersed gold or similarly noble metals is not entirely limited to ore pulp as defined in the introductory paragraphs of the specification for it will be apparent that it may be used to separate the metal from the fluid of a so-called colloidal sol of the metal or for the separation of gold from sea water containing suspensoids of the gold.

I claim:

1. The herein described steps in a process for the recovery of gold and other noble metals in dispersed phase in ore pulp comprising moving the said pulp into contact with mercury, passing a low voltage unidirectional current through the pulp to the mercury, and simultaneously subjecting the pulp adjacent to the mercury to the influence of a relatively high voltage fluctuating electrical field, thereby to cause the dispersed gold or other noble metal to form an amalgam with the mercury.

2. The herein described steps in a process for the recovery of gold and other noble metals in dispersed phase in ore pulp comprising moving the said pulp into contact with mercury, passing a low voltage unidirectional current through the pulp to the mercury, simultaneously subjecting the pulp and the mercury to centrifugal force, and simultaneously subjecting the pulp adjacent to the mercury to the influence of a relatively high voltage fluctuating electrical field, thereby to cause the dispersed gold or other noble metal to form an amalgam with the mercury.

3. A process for the recovery of gold in dispersed phase in ore pulp which consists, in moving the said pulp into contact with mercury, in passing a low voltage unidirectional current through the pulp to the mercury, and in simultaneously subjecting the pulp adjacent to the mercury to the influence of a relatively high voltage alternating current electrical field, thereby to cause the dispersed gold to form an amalgam with the mercury.

4. A process for the recovery of gold in dispersed phase in ore pulp which consists, in moving the said pulp into contact with mercury, by centrifugal force, in passing a low voltage unidirectional current through the pulp to the mercury, and in simultaneously subjecting the pulp adjacent to the mercury to the influence of a relatively high voltage alternating current electrical field, thereby to cause the dispersed gold to form an amalgam with the mercury.

5. A process for the recovery of gold in dispersed phase in ore pulp which consists, in moving the said pulp into contact with mercury, in passing a low voltage unidirectional current through the pulp to the mercury, and in simultaneously subjecting the pulp adjacent to the mercury to the influence of a relatively high frequency alternating current electrical field, thereby to cause the dispersed gold to form an amalgam with the mercury.

6. In a process for the recovery of gold particles in ore pulp which consists, in causing the pulp to contact with a mercury cathode, in passing a low voltage unidirectional current through said pulp to said mercury cathode, and in simultaneously subjecting the pulp adjacent to the cathode to the influence of a fluctuating electrical field, established at a difference in potential of at least ten thousand volts, and fluctuating at the rate of at least one thousand fluctuations per second.

7. A process for the recovery of dispersed metals capable of amalgamation with mercury from ore pulp which comprises causing the pulp to contact with mercury, passing a low voltage unidirectional current through the pulp to said mercury, and simultaneously establishing a relatively high tension electrical field in the region of the contacting portions of the pulp and the mercury.

8. In a process for the recovery of particles of gold and other noble metals from ore pulp which consists, in passing the pulp in a continuous stream over a mercury cathode, in passing a continuous unidirectional current through the pulp stream to the mercury cathode as it passes over the surfaces thereof, and in simultaneously subjecting the moving pulp stream and the mercury cathode to the influence of a fluctuating high potential electrical field.

9. A process for recovering by amalgamation with mercury gold and similar noble metals in dispersed phase in ore pulp which consists, in causing the pulp to contact with a mercury cathode, in causing a low voltage current to flow through the pulp to said mercury cathode, and in simultaneously causing a high tension fluctuating current to flow through the pulp between an electrode and said mercury cathode.

10. A process for the recovery of suspended particles of gold or other noble metals from ore pulp which consists, in causing the pulp to contact with mercury, in passing a low voltage unidirectional current through the pulp to said mercury, and in simultaneously subjecting the contacting portions of the pulp and the mercury to the influence of a fluctuating high potential electrical field.

11. The herein described steps in a process for the recovery of particles of gold or other noble metals from ore pulp which consists, in causing the pulp to contact with mercury, in subjecting the pulp and the mercury to centrifugal force, and in subjecting the pulp as it contacts the mercury under centrifugal force to the influence of a fluctuating high potential electrical field.

12. A process for the recovery of gold and other noble metals in dispersed phase in ore pulp which consists, in moving the said pulp into contact with an amalgam of mercury and metallic sodium, in passing a low voltage unidirectional current through the pulp to the amalgam, and in simultaneously subjecting the pulp adjacent to the amalgam to the influence of a relatively high voltage fluctuating electrical field, thereby to cause the dispersed gold or other noble metal to enter said amalgam.

13. A process for the separation of the dispersed metal from a colloidal metal solution wherein the metal is capable of forming an amalgam with mercury, which consists, in causing the solution to contact with a mercury cathode, in passing a low voltage unidirectional current through the solution, from an electrode contacting therewith, to said mercury cathode, and in simultaneously subjecting the solution contacting the said cathode to the influence of a fluctuating high potential electrical field.

14. An apparatus for the recovery of gold and other noble metals in dispersed phase in ore pulp comprising, a mercury cathode, means for moving the pulp into contact with said cathode, means for passing a low voltage unidirectional current through said pulp to said cathode, and means for simultaneously subjecting the pulp adjacent to said cathode to the influence of a fluctuating high potential electrical field.

15. An apparatus for the recovery of gold in dispersed phase in ore pulp comprising, a mercury cathode, an electrode, a low voltage unidirectional current source having the negative terminal thereof connected with said cathode and the positive terminal thereof connected to said electrode, means for moving said pulp into contact with said electrode and said cathode, and means producing a fluctuating high potential electrical field in the pulp adjacent to said mercury cathode.

16. An apparatus for the recovery of gold or other metals capable of forming an amalgam with mercury from ore pulp comprising, a mercury cathode, centrifugal means for causing said pulp to flow over said mercury cathode, means for passing a low voltage unidirectional current through said pulp to said mercury cathode, and means providing a fluctuating relatively high potential electrical field in that area including the contacting surfaces of the pulp and said mercury cathode.

17. A process for recovering metallic particles subject to amalgamation from fluid within which the particles are suspended which comprises, causing the fluid to contact a mercury surface, impressing a negative low potential electrical charge upon said surface with respect to the fluid, and subjecting the fluid in the region of said mercury surface to the influence of a relatively high tension electrical field.

18. A process for recovering metallic particles subject to amalgamation from fluid within which the particles are suspended which comprises, causing the fluid to contact a negatively charged mercury surface, and subjecting the fluid in the region of said mercury surface to the influence of a relatively high tension electrical field generated independently of the electrical forces producing the negative charge on said mercury surface.

19. The herein described steps in a process for the recovery of gold and other metals in dispersed phase in a fluid ore pulp which consists, in causing the dispersed metal to move toward a mercury cathode by the action of a uniform unidirectional electrical field, and in simultaneously applying electrical forces produced by an alternating electrical field to facilitate amalgamation of the noble metal with the mercury.

20. The herein described steps in a process for the recovery of gold and other metals in dispersed phase in a fluid ore pulp which consists, in causing the dispersed metal to move toward a mercury cathode by the action of a uniform unidirectional electrical field, and in simultaneously applying electrical forces produced by an alternating electrical field along the surface of the mercury to facilitate amalgamation of the noble metal therewith.

WILLIAM ALFRED BIESMANN.